(12) United States Patent
Critelli et al.

(10) Patent No.: US 7,458,537 B2
(45) Date of Patent: Dec. 2, 2008

(54) TAPE MEASURE WITH POST REINFORCING COLLAR

(75) Inventors: James M. Critelli, Fuquay-Varina, NC (US); Jonathan S. Beckwith, Raleigh, NC (US)

(73) Assignee: Cooper Brands, Inc., Houston, TX (US)

( * ) Notice: Subject to any disclaimer, the term of this patent is extended or adjusted under 35 U.S.C. 154(b) by 621 days.

(21) Appl. No.: 11/140,815

(22) Filed: May 31, 2005

(65) Prior Publication Data

US 2006/0266867 A1 Nov. 30, 2006

(51) Int. Cl.
*B65H 75/48* (2006.01)

(52) U.S. Cl. .................... 242/376; 242/376.1

(58) Field of Classification Search ........... 242/375, 242/375.1–375.2, 376, 376.1, 379; 33/761
See application file for complete search history.

(56) References Cited

U.S. PATENT DOCUMENTS

| | | | |
|---|---|---|---|
| 3,073,544 A | 1/1963 | Cirves et al. |
| 3,216,117 A | 11/1965 | Stowell |
| 3,672,597 A | 6/1972 | Williamson |
| 3,715,526 A | 2/1973 | Blanch et al. |
| 3,812,588 A | 5/1974 | Bennett |
| 3,862,761 A | 1/1975 | Conley |
| 4,031,774 A | 6/1977 | Bennett |
| 4,142,693 A | 3/1979 | Czerwinski |
| 4,286,387 A | 9/1981 | Di Diego |
| 4,363,171 A | 12/1982 | Scandella |
| 4,458,856 A | 7/1984 | Mansel-James |
| 4,487,379 A | 12/1984 | Drechsler et al. |
| 4,662,078 A | 5/1987 | Gammon et al. |
| 4,756,087 A | 7/1988 | Sing |
| 4,907,348 A | 3/1990 | Hubbard, Jr. |
| 4,986,487 A | 1/1991 | Irvin |
| 5,014,437 A | 5/1991 | Sun |
| 5,386,643 A | 2/1995 | Corcoran |
| 5,416,978 A | 5/1995 | Kaufman |
| 6,053,447 A | 4/2000 | Omri |
| 6,131,844 A | 10/2000 | Hsu |
| 6,243,964 B1 | 6/2001 | Murray |
| 6,276,071 B1 | 8/2001 | Khachatoorian |
| 6,318,664 B1 | 11/2001 | Sumiyashiki |
| 6,324,769 B1 | 12/2001 | Murray |

(Continued)

FOREIGN PATENT DOCUMENTS

GB 989887 4/1965

*Primary Examiner*—Sang Kim
(74) *Attorney, Agent, or Firm*—Coats & Bennett PLLC

(57) ABSTRACT

A tape measure includes a post with at least first and second arms spaced from one another to form a longitudinal slot having an end aperture for coupling with a tape blade retraction spring. The post distal end anchors to a housing sidewall via a fastener, and a fastener engagement region of the post extends from the aperture to the fastener's terminus. A distinct reinforcing collar is disposed about the post's distal portion and acts to limit movement of the arms away from one another. The collar may overly the post for at least half of the fastener engagement region and/or may abut a shoulder on the post. The fastener may have a first pullout resistance level without the collar present and a second higher pullout resistance level, advantageously double or more, with the collar present. Also, methods of assembly are described.

24 Claims, 7 Drawing Sheets

U.S. PATENT DOCUMENTS

| | | |
|---|---|---|
| 6,347,462 B1 | 2/2002 | Steinich |
| 6,381,863 B1 | 5/2002 | Steinich |
| 6,405,451 B1 | 6/2002 | Hsu |
| 6,449,866 B1 | 9/2002 | Murray |
| 6,477,785 B1 | 11/2002 | Hsu |
| 6,612,046 B1 | 9/2003 | Cimorell et al. |
| 6,643,947 B2 | 11/2003 | Murray |
| 6,718,649 B1 | 4/2004 | Critelli et al. |
| 6,751,883 B2 | 6/2004 | Liao |
| 6,766,588 B1 | 7/2004 | Hsu |
| 6,811,109 B1 | 11/2004 | Blackman et al. |
| 6,994,289 B2 * | 2/2006 | Liao ........................ 242/376.1 |

* cited by examiner

TAPE MEASURE WITH POST REINFORCING COLLAR

BACKGROUND OF THE INVENTION

The present invention is directed generally to power-return tape measures of the type commonly used to measure linear distances.

Modern tape measures (or "tape rules") typically include a coiled tape that is spring-biased towards a retracted position. A housing generally surrounds and protects the tape and a retraction spring and includes an opening through which a distal end of the tape extends. Typically, the tape measure housing consists of two housing halves that are joined together by one or more screws. In addition, one of the housing halves typically includes an inwardly pointing integral post that provides an anchoring point for one end of the retraction spring. During use, the distal end of the tape is pulled away from the housing; when released, the retraction spring pulls the tape back into the housing so that the tape returns to the retracted position.

One important consideration when designing commercially available tape measures is that the tape measure should be able to function even after being repeatedly dropped, as frequently occurs on a construction site. Dropping the tape measure subjects the tape measure to substantial shock loadings that sometimes lead to the retraction spring becoming pinched or otherwise misaligned with respect to the anchoring post, quickly rendering the tape measure unusable. As such, it is becoming more common to anchor the post to the housing, such as by screwing the two together at both ends of the post.

The post typically includes a slot that is used to engage the retraction spring. Indeed, one approach to configuring the post is to have the slot extend all the way to one end of the post, so that the spring may be slid into engagement with post by inserting the spring into the slot from the "split" end of the post. Then, when installation is complete, the screw used to secure that end of the post to the housing also serves, in a way, to close off the slot so as to capture the spring in the slot. In addition, the tape measure's belt clip is sometimes attached to the housing using the same screw that secures the split end of the post. However, it has been found that securing the belt clip to the housing in this fashion sometimes leads to the screw being pulled out, particularly when the tape measure is being removed from its packaging by the consumer.

Accordingly, there remains a need for alternative tape measure designs, preferably designs that are more robust.

SUMMARY OF THE INVENTION

The present invention is directed to a power-return tape measure, and/or a method of assembling a power-return tape measure, that employs a reinforcing collar to help keep a fastener engaged with a post that acts to retain the retraction spring.

In one embodiment, the tape measure comprises: a housing having first and second sidewalls and a peripheral wall extending between the sidewalls; a post disposed between the first and second sidewalls and extending along a longitudinal axis; the post including a proximal end anchored to the first sidewall, at least first and second arms spaced from one another to form a longitudinal slot having an end aperture facing away from the proximal end, and a distal end comprising the end aperture; a tape blade retraction spring coupled to the post via the slot so as to provide a retraction bias for a tape measure blade; a fastener (e.g., a screw) extending through the second sidewall and the end aperture and terminating at a location along the slot, the fastener engaging an interior portion of the post to define a fastener engagement region extending from the end aperture to the terminating location; the fastener anchoring the post distal end to the second sidewall; and a reinforcing collar distinct from the housing and the post, the collar disposed about the post proximate the distal end so as to overlie the post for at least half of the fastener engagement region; the collar engaging the post and limiting movement of the arms away from the longitudinal axis.

In another embodiment, the tape measure may comprises: a housing having first and second sidewalls and a peripheral wall extending between the sidewalls; a post disposed between the first and second sidewalls and extending along a longitudinal axis; the post including a proximal end anchored to the first sidewall, at least first and second arms spaced from one another to form a longitudinal slot having an end aperture facing away from the proximal end, and a distal end comprising the end aperture; a tape blade retraction spring coupled to the post via the slot so as to provide a retraction bias for a tape measure blade; a fastener (e.g., a screw) extending through the second sidewall and the end aperture and terminating along the slot, the fastener engaging an interior portion of the post to define a fastener engagement region extending from the end aperture to the terminating location; the fastener anchoring the post distal end to the second sidewalk; and a reinforcing colllar distinct from the housing and the post, the collar disposed about the post prximate the distal end so as to overlie the post for at least half of the fastner engagemnet regioin; the collar engaging the post and limiting movement of the arms away from the longitudinal axis. post and anchoring the post distal end to the second sidewall; a reinforcing collar distinct from the housing and the post, the collar disposed about the post proximate the distal end so as to overlie a portion of the post and the fastener; the collar engaging the post and limiting movement of the arms away from each other; wherein the fastener has a first pullout resistance level without the collar present and a second higher pullout resistance level with the collar present; the second pullout level being at least twice the first pullout resistance level.

In another embodiment, the tape measure may comprise: a housing having first and second sidewalls and a peripheral wall extending between the sidewalls; a post disposed between the first and second sidewalls and extending along a longitudinal axis; the post including a proximal end anchored to the first sidewall, at least first and second arms spaced from one another to form a longitudinal slot having an end aperture facing away from the proximal end, and a distal end comprising the end aperture; the post further comprising an area proximate the distal end having reduced cross-section bounded by a shoulder; a tape blade retraction spring coupled to the post via the slot so as to provide a retraction bias for a tape measure blade; a fastener extending through the second sidewall and the end aperture and anchoring the post distal end to the second sidewall; and a reinforcing collar distinct from the housing and the post, the collar disposed about the post proximate the distal end and abutting the shoulder, the collar limiting movement of the arms away from each other.

In another embodiment, the tape measure may comprise: a main case having first and second sidewalls and a peripheral wall extending between the sidewalls; a post disposed between the first and second sidewalls and extending along a longitudinal axis; the post including a proximal end anchored to the first sidewall, at least first and second arms spaced from one another to form a longitudinal slot having an end aperture facing away from the proximal end, and a distal end comprising the end aperture; a tape blade retraction spring coupled to the post via the slot so as to provide a retraction bias for a tape measure blade; a fastener extending through the second sidewall and the end aperture and anchoring the post distal end to the second sidewall; and means, distinct from the housing and the post, for limiting movement of the arms away from each other.

Some embodiments generally described above may additionally have one or more of the following characteristics: The post may include an area proximate the distal end having reduced cross-section, with the collar engaging the post in the reduced area. The collar may overlie and reinforce the post for at least 75% of the fastener engagement region, or at least 90%. The second sidewall may comprise an inwardly facing recess having a diameter greater than the post distal end; with a distal end of the collar disposed in the recess. A tape measure supporting means, such as a belt clip, may be secured to the housing by the fastener. The post may or may not be distinct from the main case.

In another embodiment, a method of assembling a tape measure may comprise: providing a main case and a post coupled to the main case, the post having a slot therein extending to a distal end thereof so as to form first and second arms; coupling a spring to the post via the slot; supporting a tape measure blade with the housing and providing a retraction force thereto with the spring; anchoring the distal end of the post to the main case with a fastener, the fastener extending through a sidewall of the main case and engaging the an interior of the post; and disposing a collar about the distal end of the post, internal to the housing, so as to limit movement of the arms away from each other; the collar distinct from the housing and the post, but engaging the post. The method may further comprise fastening a tape measure support means to an exterior of the main case with the fastener. A fastener engagement region associated with the post may be defined to extend from an opening on the distal end of the post to a location where the fastener terminates along the post, and disposing the collar about the distal end of the post may comprise disposing the collar about the distal end of the post so as to overlie at least 50% of the fastener engagement region. The collar may, in at least some embodiments, at least double a pullout resistance of the fastener compared with the same structure without the collar.

DETAILED DESCRIPTION OF THE INVENTION

Figure 1:
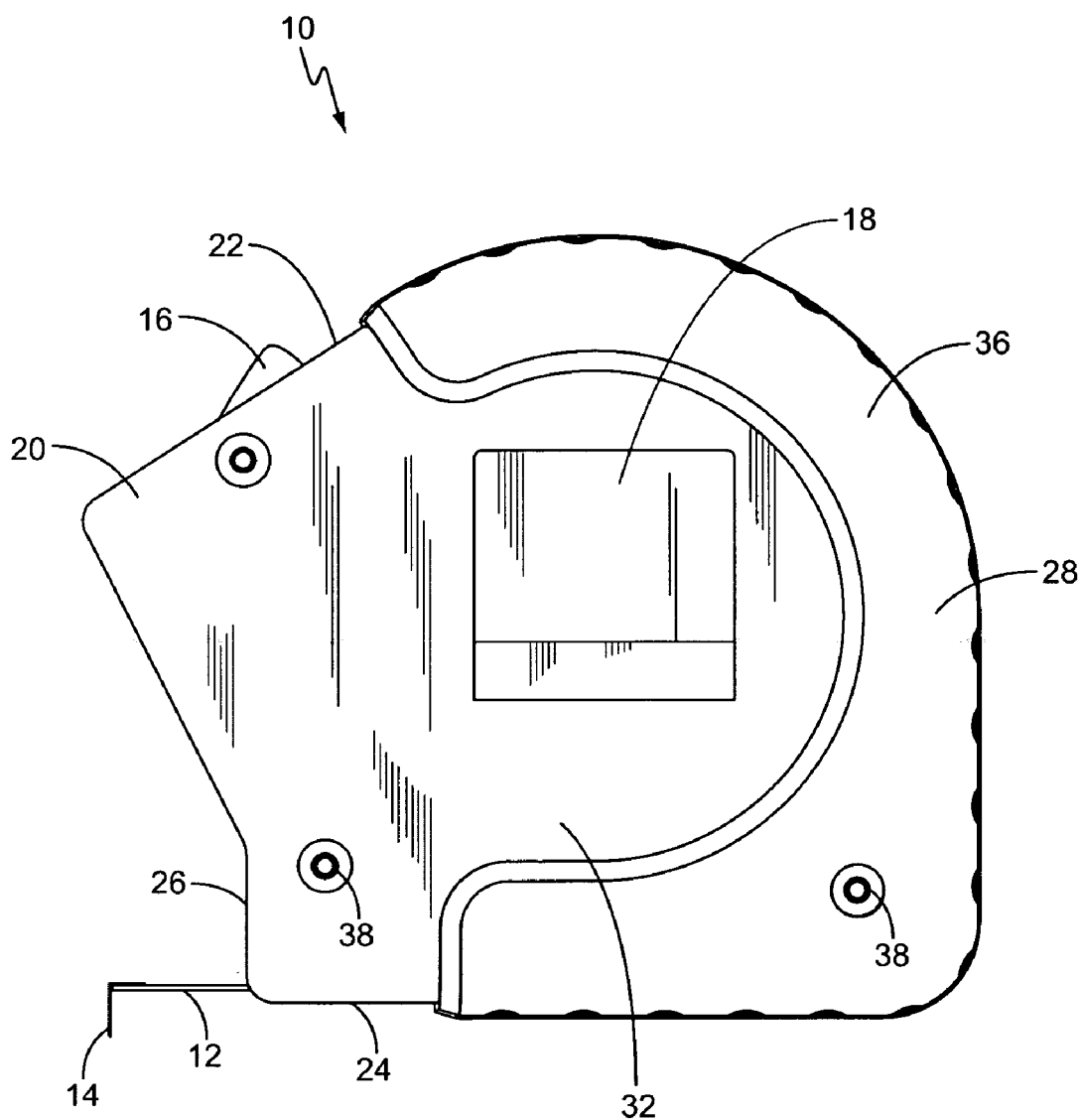
FIG. 1 is a side view of one tape measure embodiment constructed in accordance with the present invention.

As illustrated in FIG. 1, a tape measure, generally designated 10, is shown constructed according to the present invention. The tape measure 10 includes a coilable measuring tape or blade 12 and an associated housing 20. The distal end of the tape 12 advantageously includes an end hook 14 to prevent it from being retracted into the housing 20. A tape-biasing device, such as a retraction spring 88, is operatively connected to the tape 12 to bias the tape 12 towards a retracted position. A locking mechanism, including a toggle 16 or similar actuator, is provided to aid in controlling the movement of the tape 12 into and out of the housing 20. A clip 18, sometimes referred to as a belt clip, is attached to a side of the housing 20, as discussed further below. As the general design and operation of power-return tape measures are well known in the art, additional detailed discussion of some components is omitted herein for brevity. However, additional discussion may be found in U.S. Pat. Nos. 4,527,334; 4,976,048; and 6,349,482, which are incorporated herein by reference.

Figure 2:
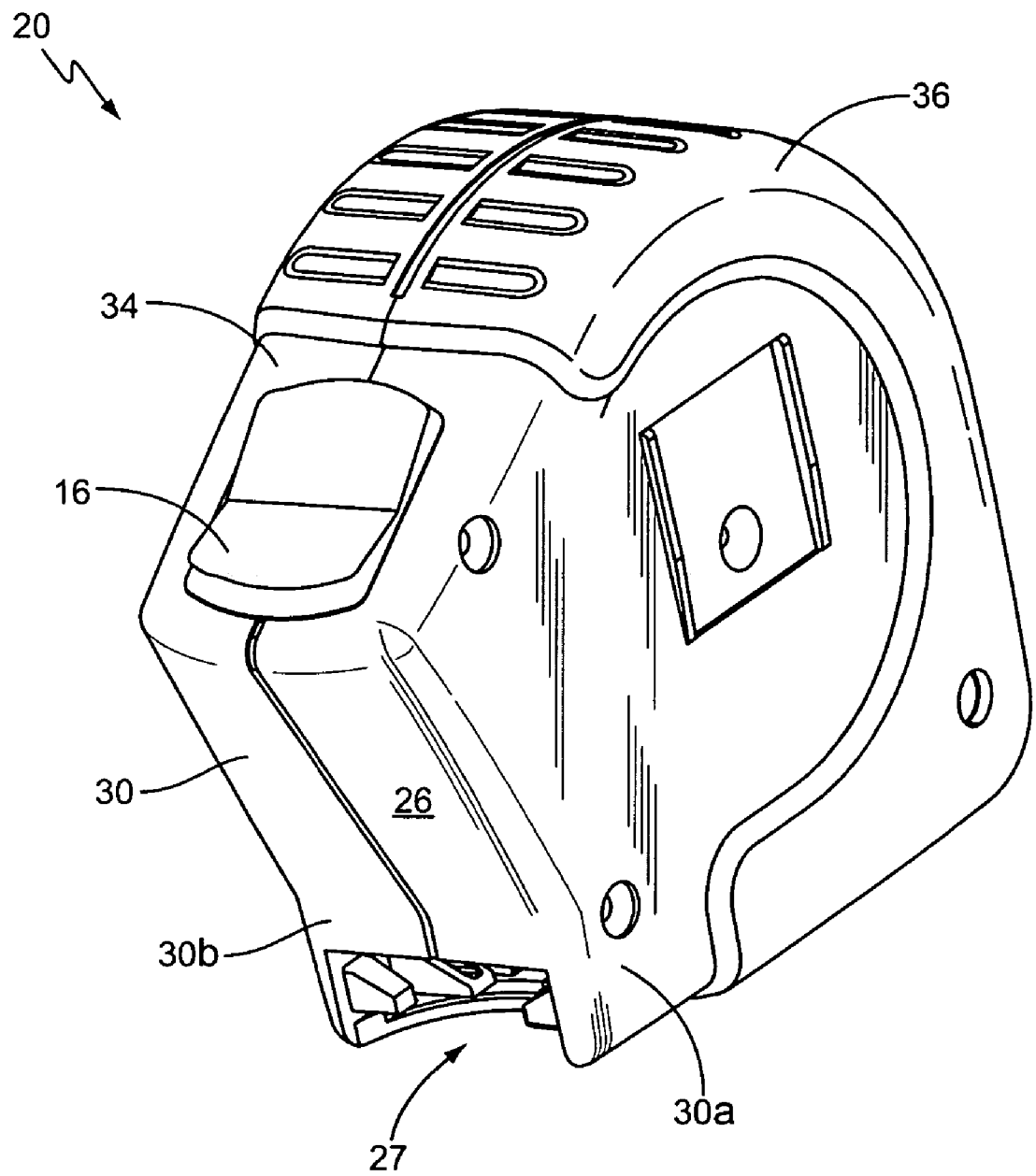
FIG. 2 is a perspective view of one embodiment of a tape measure housing in accordance with the present invention with some elements removed for clarity (e.g., screws, clip, etc.).
Figure 3:
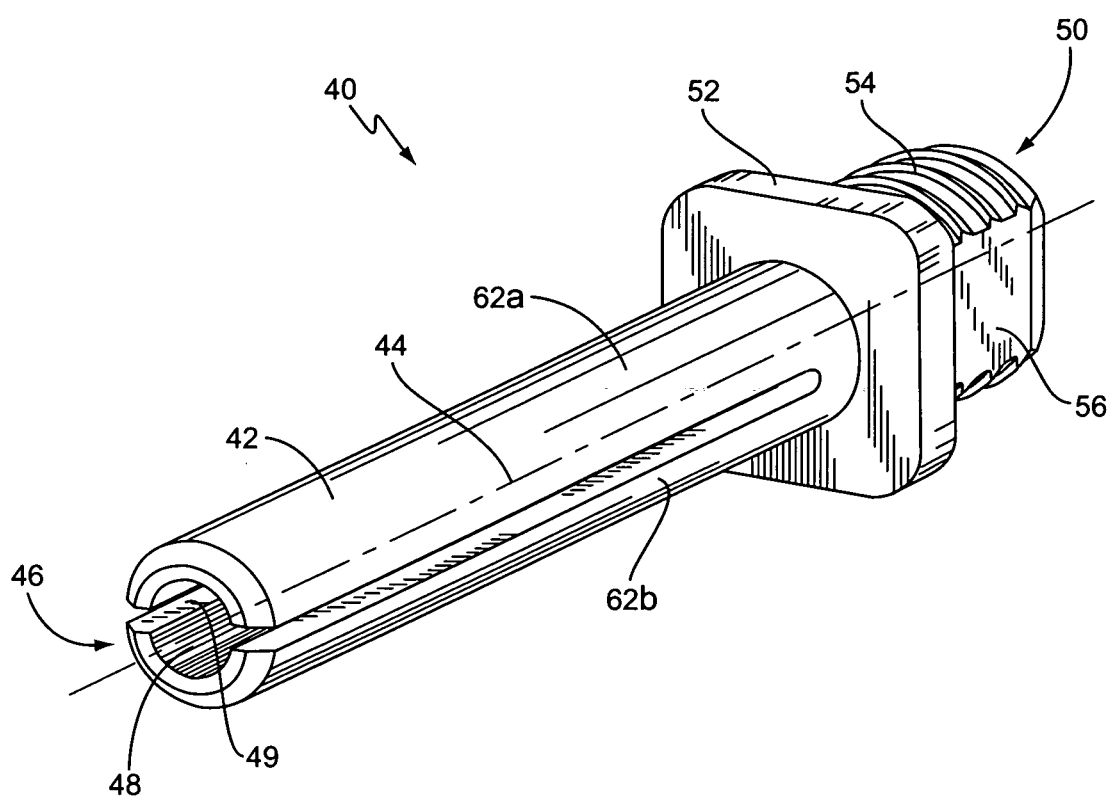
FIG. 3 is a perspective view of one embodiment of a post suitable for the present invention.

The housing 20 typically includes a main case or shell 30 and a grip element 36 mounted on the shell 30. The housing 20 preferably has a generally squarish shape, with a rounded upper-rear corner and may have a slightly projecting nose, as shown in FIGS. 1-2. The housing 20 includes an opposing pair of sidewalls 32 and an interconnecting peripheral wall 34 that help define an internal chamber 29 that houses the coiled portion of the tape 12, a suitable tape-biasing device, and portions of the locking mechanism. As shown in the Figures, the peripheral wall 34, and thus the shell 30, may be thought of as having a top 22, a bottom 24, a front 26, and a rear 28. The housing 20 typically includes an opening 27 near its lower-front corner that connects to the internal chamber 29. The distal end of the tape 12 extends through this opening 27. The housing 20 is preferably sized to fit within a user's hand, and also conveniently stored on a work belt or in a toolbox.

As shown in FIG. 2, the shell 30 may be constructed from two portions, a right-hand portion 30a and a left-hand portion 30b, joined together by suitable screw(s) 38, as is known in the art. The external configurations of both the shell portions 30a,30b and the grip element portions 36 may advantageously be symmetrical if desired, but this is not required. Indeed, the two portions 30a,30b may have different internal and external configurations, depending on the internal workings of the tape measure 10, also as is known in the art. Further information on possible external configurations of the housing 20 may be found in U.S. Patent Application Publication 2003/0233762 entitled "Tape Measure Housing with Grip Element," which is incorporated herein by reference.

The blade winding drum (or "reel") 86 is rotatably mounted in the housing 20 and typically takes the commonly known bobbin-like form with two parallel flanges and an intervening core. The tape blade 12 is wound about the core in a convolute coil, with the inner portion of the core providing a central cavity for substantially housing the retraction spring 88. Spring 88 is anchored on one end to the post 40, as discussed further below, and provides a bias to retract the tape blade 12. The drum 86 may be mounted to rotate against suitable bosses in the sidewalls 32, such as boss 82, or other rotating arrangements known in the art may be used.

Post 40 is disposed between the respective sidewalls 32, internal to the housing, and provides an anchoring point for the retraction spring 88. Post 40 may be formed integrally with one of the housing shell portions 30a,30b, or may be a distinct therefrom. As the later arrangement is believed advantageous, the discussion following will assume that the post 40 is a distinct part, although either arrangement is intended to fall within the scope of the present invention. In one embodiment, post 40 includes a column portion 42 and an anchoring (or base) portion 50. The column portion 42 is generally elongate along axis 44, and may advantageously have a generally circular cross-section split by slot 49. The slot 49 extends from the terminal end 46 of post 40 to toward the anchoring portion 50, and is advantageously, but not necessarily, straight. Thus, the slot 49 helps form two parallel arms 62a,62b. The terminal end 46 of post 40 includes a hole 48 that is intended to accept post anchoring screw 90a, as described further below. Hole 48 is essentially the continuation of slot 49 and provides access to the remainder of the slot 49. The anchoring portion 50 of the post 40 is anchored to housing 20 in any known fashion. For example, post anchoring portion 50 may include a flange 52, a plurality of ribs 54, and flats 56. The flange 52 is disposed proximate the column portion 42, and advantageously has a non-circular shape. The ribs 54 extend radially outward from the axis 44. The end of the anchoring portion 50 opposite the column portion 42 may also advantageously include a hole 58, similar to hole 48 in size, for accepting anchoring screw 90a. For more details of one embodiment of the anchoring portion 50 of post 40, and its interaction with the housing 20, attention is directed to U.S. Pat. No, 6,718,649, which is incorporated herein by reference.

A reinforcing collar 70 is disposed about the column portion 42 of post 40, proximate where the post 40 engages sidewall 32. The interior surface 72 of collar 70 engages the outer surface of post 40 in an area where the post 40 engages the post anchoring screw 90b. Indeed, the area where screw 90b engages the post 40 may be thought of as a fastener engagement region 80, which extends from hole 48 to the point 92 where screw 90 terminates in slot 49. The collar 70 advantageously overlies the post 40 for at least part of this fastener engagement region 80. Thus, when screw 90b is present, collar 70 also overlies a portion of screw 90b, either indirectly with post 40 therebetween or directly via the slot 49. The collar 70 acts to constrain an outward movement of arms 62a,62b, thereby increasing the gripping strength between the post 40 and screw 90b, as described further below.

In one embodiment, the collar 70 advantageously takes the form of a cylindrical metallic body length L and wall thickness T. For this embodiment, the inner diameter of the collar 70 is just barely larger than the corresponding outer diameter of the post 40, so as to have a sliding fit therebetween. The wall thickness T of the collar 70 will depend on the strength required and on other considerations, but a thickness T of approximately 0.4 mm (0.0157 inches) for a collar 70 of low or medium carbon steel has been found to be acceptable. The length L of the collar 70 along the axis 44 depends on the desired overlap between the collar 70 and the post 40. It is believed advantageous if the collar 70 is long enough to overlie half of the fastener engagement region 80, more advantageously at least 75%, or at least 90% in some embodiments.

The distal tip of post 46 may advantageously be disposed in recess 84 formed in boss 82 of sidewall 32 of shell left-hand portion 30b when the tape measure 10 is assembled. The collar 70 may reside outside the recess 84 in some embodiments, but in other embodiments the distal portion 74 of collar 70 resides in recess 84. It is believed advantageous, in order to avoid having to modify any existing tooling for the housing 20, for the column portion 42 of post 40 to have an area 78 with reduced cross-section (typically, diameter) for accepting the collar 70, with the collar 70 filling this recessed area 78 so as to form a post and collar combination with a cross-sectional dimension consistent with the remainder of the column portion 42. The reduced cross-section area 78 joins to the remainder of the post at shoulder 78a, which functions to help axially locate the collar 70 along the post 40. For such an arrangement, the collar 70 may fit over the post 40 without requiring an increase in any existing dimensions of recess 84. Thus, in some embodiments, the collar 70 is trapped between the shoulder 78a on the post 40 and the bottom face of recess 84, preferably just engaging both.

As pointed out above, the presence of collar 70 acts to constrain outward movement of arms 62a,62b of post 40, thereby increasing the gripping strength between screw 90b and post 40. Because arms 62a,62b are prevented from moving significantly laterally (e.g., radially) outward, the threads on screw 90b stay properly engaged with the interior surface of post 40 in the fastener engagement region 80. The presence of the collar 70 increases what is referred to herein as the "pullout resistance level" of the screw 90b. The pullout resistance level reflects the amount of force required to pull the screw 90b out of engagement of with the post 40 (thereby, e.g., allowing the clip 18 to fall off the housing 20). The screw 90b of a tape measure of the construction described above, but without the collar 70, will have a first pullout resistance level, such as ten to fifteen pounds. The screw 90b of a tape measure 10 of the construction described above, with collar 70 in place, will have a second higher pullout resistance level, such as thirty or more pounds.

Figure 4:
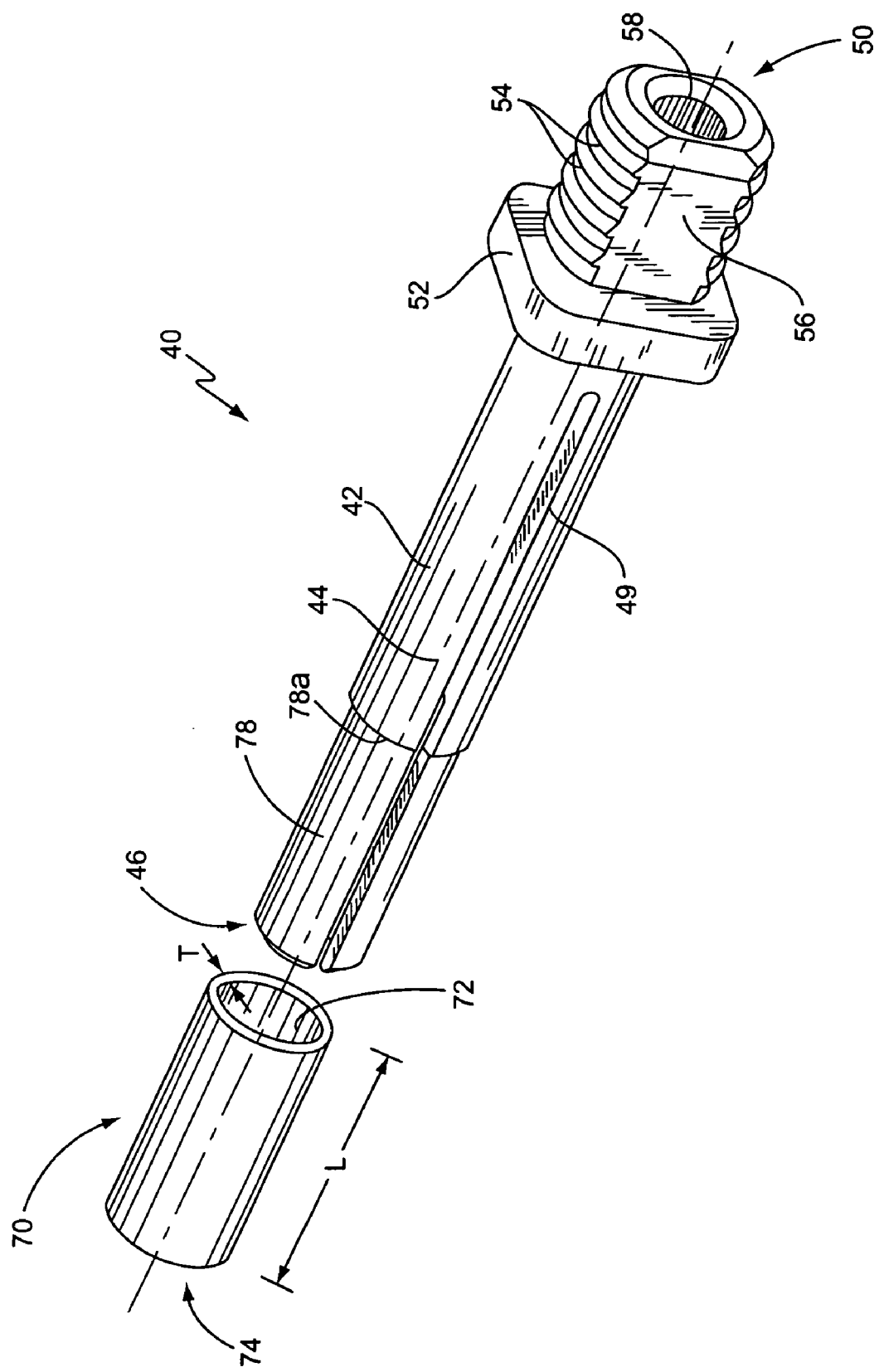
FIG. 4 is show another embodiment of a post with a corresponding collar.
Figure 5:
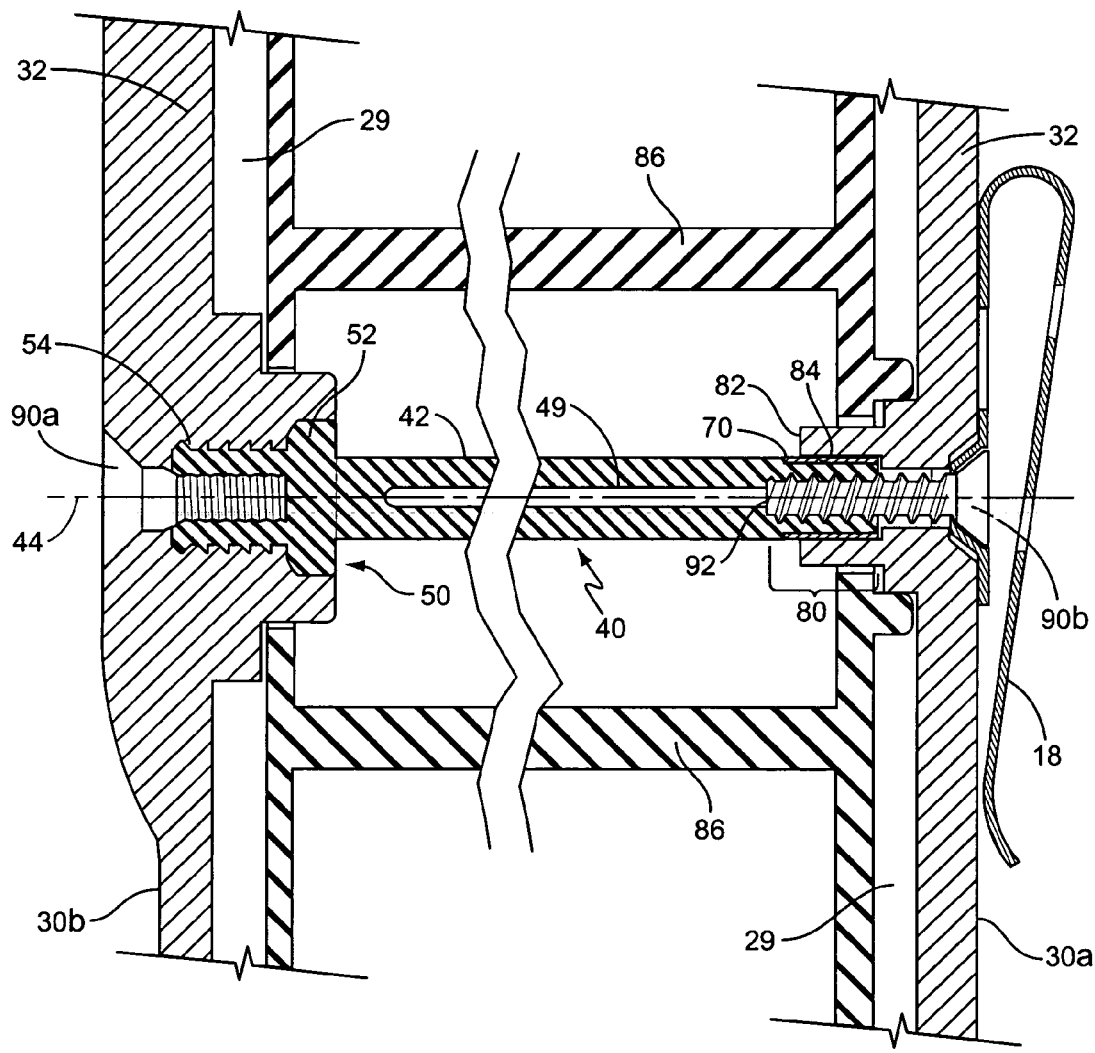
FIG. 5 shows a partial cross-section of the assemble tape measure.
Figure 6:
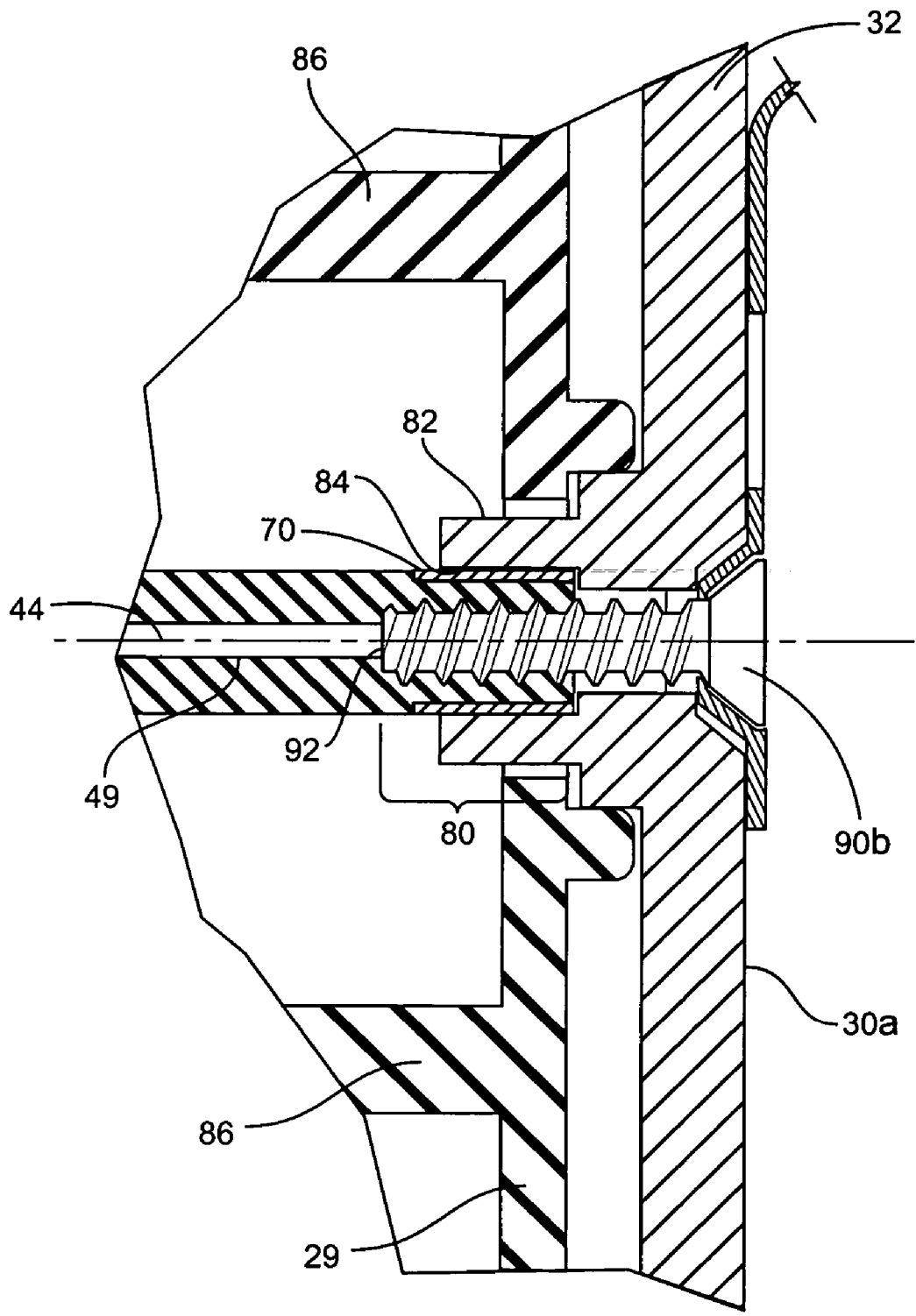
FIG. 6 shows a more detailed view of a portion of FIG. 5.
Figure 7:
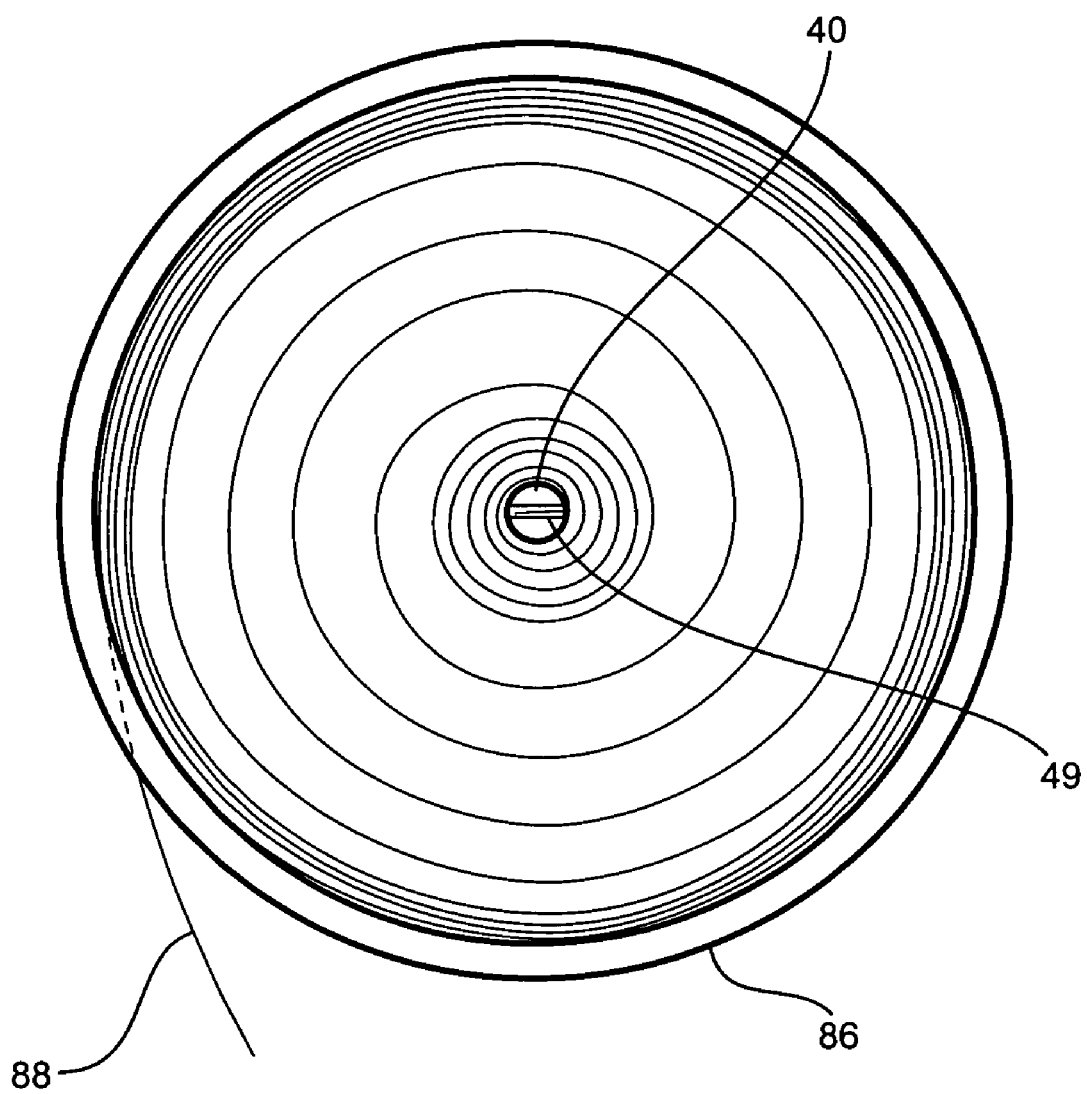
FIG. 7 shows a simplified side view of the retraction spring, post, and reel.

Some tests have been performed to verify the increase in pullout strength. These tests involved screwing a screw into a metallic post of the type generally shown in FIG. 4. A tensile force was then applied to this combination without a collar in place. The resulting tensile force required to pull the screw out of the post was below measurable levels, but believed to be not more than about forty pounds. Another sample was prepared in a similar fashion, but this time with a collar of type shown in FIG. 4 added. The resulting tensile force required to pull the screw out of the post was in excess of one hundred thirty pounds. These results, while not performed on a completed tape measure, show that the addition of the collar 70 at least doubles the pullout resistance level of the screw 90b, and likely increases the pullout resistance level by much more than that.

Means for externally supporting the tape measure is provided by belt clip 18. The belt clip 18 may take any form known in the art, such as the conventional modified "R" shape well known in the art. See U.S. Pat. No. 4,527,334, which is incorporated herein by reference. Of course other configurations of clip 18 are also possible. Indeed, the tape measure support means may take the form of a bracket, a spring biased pivot arm clip, a magnet, or any other attachment/support means known in the tape measure art.

The tape measure 10 may be assembled using mostly conventional techniques, with some modifications to accommodate that addition of collar. For example, anchoring portion 50 of post 40 is mated to shell half 30a and reel 86 and spring 88 are mounted to shell half 30a, with one end of spring 88 being inserted into slot 49 of post 40. The reel 86 is then temporarily clamped to the shell half 30a and the "free end" of spring 88 is then rotated about the reel 86 so that a preload is placed on the spring 88, typically using a powered winding tool/fixture. The free end of the spring 88 is routed out of the shell half 30a and an optional drum cap (not shown) is then snapped onto the drum 86, with the post 40 extending through the drum cap. The tape blade 12 (with hook 14 attached) is then connected to the free end of the spring 88, and the spring 88 released so that the blade 12 is wound onto the reel 86. The collar 70 is placed over the post 40 and the locking mechanism (e.g., toggle 16, etc.) and other relevant internal components are then added along with the other shell half 30b. Screws 38 are added to hold the housing halves 30a,30b together. Post mounting screw 90b is inserted through clip 18 and corresponding sidewall 32 and screwed into its respective hole 48 in post 40, thereby very firmly mounting the post 40 and clip 18 to shell 30. From this point, the assembly of the tape measure 10 continues in a conventional fashion, e.g., labels are added, testing, etc.

For materials, the majority of the housing is preferably made from a durable material such as a hardened plastic (e.g., ABS, polycarbonate, or the like), except the grip element portions 36 which are preferably made from an elastomeric material. The post 40 is preferably made from metal, such as steel or zinc alloys (e.g., a zinc-aluminum-magnesium-copper alloy known as zamak-5), using a die cast process. Using a metallic post 40 allows the post 40 to be of a smaller size while still retaining the requisite strength. The collar 70 is preferably metallic, such a low or medium carbon steel.

The discussion above has assumed that the fastener used to anchor the distal end 46 of post 40 to the housing 20 is a screw. As such, the discussion has generally assumed that the interior portion of post 40 in the fastener engagement region 80 is threaded, or alternatively that post mounting screw 90b is self-tapping. However, such is not required. Instead, the fastener 90b may take forms other than a screw, such as a quarter-turn fastener, a latching shaft, a snap-fit post with barbs, or the like. However, even in these alternative embodiments, the collar 70 constrains the arms 62a,62b of post 40 against lateral movement out of engagement with the fastener 90b.

It should be understood that the tape measures 10 of the present invention may also include other features, such as shock-absorbing bumpers proximate the opening 27, specially coated blades 12, reinforcing hooks 14, various locking mechanisms, and like, all of which are known in the art.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A power-return tape measure, comprising:
 a housing having first and second sidewalls and a peripheral wall extending between said sidewalls;
 a post disposed between said first and second sidewalls and extending along a longitudinal axis; said post including a proximal end anchored to said first sidewall, at least first and second arms spaced from one another to form a longitudinal slot having an end aperture facing away from said proximal end, and a distal end comprising said end aperture;
 a tape blade retraction spring coupled to said post via said slot so as to provide a retraction bias for a tape measure blade;
 a fastener extending through said second sidewall and said end aperture and terminating at a location along said slot, said fastener engaging an interior portion of said post to define a fastener engagement region extending from said end aperture to said terminating location; said fastener anchoring said post distal end to said second sidewall; and
 a reinforcing collar distinct from said housing and said post, said collar disposed about said post proximate said distal end so as to overlie said post for at least half of said fastener engagement region; said collar engaging said post and limiting movement of said arms away from said longitudinal axis.

2. The tape measure of claim 1 wherein said collar overlies and reinforces said post for at least 75% of said fastener engagement region.

3. The tape measure of claim 1 wherein said collar overlies and reinforces said post for at least 90% of said fastener engagement region.

4. The tape measure of claim 1 further comprising a tape measure supporting means secured to said housing by said fastener.

5. The tape measure of claim 4 wherein said tape measure supporting means comprises a belt clip.

6. The tape measure of claim 1 wherein said post is distinct from said main case.

7. The tape measure of claim 1:
 wherein said second sidewall comprises a recess having a diameter greater than said post distal end; and wherein a distal end of said collar is disposed in said recess;
 wherein said post includes an area proximate said distal end having reduced cross-section, wherein said collar engages said post in said reduced area;
 further comprising a tape measure supporting means secured to said housing by said fastener; and
 wherein said collar is metallic.

8. A power-return tape measure, comprising:
 a housing having first and second sidewalls and a peripheral wall extending between said sidewalls;
 a post disposed between said first and second sidewalls and extending along a longitudinal axis; said post including a proximal end anchored to said first sidewall, at least first and second arms spaced from one another to form a longitudinal slot having an end aperture facing away from said proximal end, and a distal end comprising said end aperture;
 a tape blade retraction spring coupled to said post via said slot so as to provide a retraction bias for a tape measure blade;
 a fastener extending through said second sidewall and said end aperture and terminating at a location along said slot, said fastener engaging an interior portion of said post and anchoring said post distal end to said second sidewall;
 a reinforcing collar distinct from said housing and said post, said collar disposed about said post proximate said distal end; said collar engaging said post and limiting movement of said arms away from said longitudinal axis; and
 wherein said post includes an area proximate said distal end having reduced cross-section, wherein said collar engages said post in said reduced area.

9. A power-return tape measure, comprising:
 a housing having first and second sidewalls and a peripheral wall extending between said sidewalls;
 a post disposed between said first and second sidewalls and extending along a longitudinal axis; said post including a proximal end anchored to said first sidewall, at least first and second arms spaced from one another to form a longitudinal slot having an end aperture facing away from said proximal end. and a distal end comprising said end aperture;
 a tape blade retraction spring coupled to said Post via said slot so as to provide a retraction bias for a tape measure blade;
 a fastener extending through said second sidewall and said end aperture and terminating at a location along said slot, said fastener engaging an interior portion of said post and anchoring said post distal end to said second sidewall;
 a reinforcing collar distinct from said housing and said post, said collar disposed about said post proximate said distal end; said collar engaging said post and limiting movement of said arms away from said longitudinal axis; and wherein said second sidewall comprises an inwardly facing recess having a diameter greater than said post distal end; a distal end of said collar disposed in said recess.

10. A power-return tape measure, comprising:

a housing having first and second sidewalls and a peripheral wall extending between said sidewalls;

a post disposed between said first and second sidewalls and extending along a longitudinal axis; said post including a proximal end anchored to said first sidewall, at least first and second arms spaced from one another to form a longitudinal slot having an end aperture facing away from said proximal end, and a distal end comprising said end aperture;

a tape blade retraction spring coupled to said post via said slot so as to provide a retraction bias for a tape measure blade;

a fastener extending through said second sidewall and said end aperture and terminating along said slot, said fastener engaging said post and anchoring said post distal end to said second sidewall;

a reinforcing collar distinct from said housing and said post, said collar disposed about said post proximate said distal end so as to overlie a portion of said post and said fastener; said collar engaging said post and limiting movement of said arms away from each other;

wherein said fastener has a first pullout resistance level without said collar present and a second higher pullout resistance level with said collar present; said second pullout level being at least twice said first pullout resistance level.

11. A power-return tape measure, comprising:

a housing having first and second sidewalls and a peripheral wall extending between said sidewalls;

a post disposed between said first and second sidewalls and extending along a longitudinal axis; said Post including a proximal end anchored to said first sidewall, at least first and second arms spaced from one another to form a longitudinal slot having an end aperture facing away from said proximal end, and a distal end comprising said end aperture;

a tape blade retraction spring coupled to said post via said slot so as to provide a retraction bias for a tape measure blade;

a fastener extending through said second sidewall and said end aperture and terminating along said slot, said fastener engaging said post and anchoring said post distal end to said second sidewall;

a reinforcing collar distinct from said housing and said post, said collar disposed about said post proximate said distal end so as to overlie a portion of said post and said fastener; said collar engaging said post and limiting movement of said arms away from each other;

wherein said fastener has a first pullout resistance level without said collar present and a second higher pullout resistance level with said collar present; said second pullout level being at least twice said first pullout resistance level;

wherein said post includes an area proximate said distal end having reduced cross-section, wherein said collar engages said post in said reduced area.

12. The tape measure of claim 11 wherein said fastener engages an interior portion of said post to define a fastener engagement region extending from said end aperture to a location where said fastener terminates along said slot; wherein said collar overlies and reinforces said post for at least 50% of said fastener engagement region.

13. The tape measure of claim 12 wherein said collar overlies and reinforces said post for at least 75% of said fastener engagement region.

14. A power-return tape measure, comprising:

a housing having first and second sidewalls and a peripheral wall extending between said sidewalls;

a post disposed between said first and second sidewalls and extending along a longitudinal axis; said post including a proximal end anchored to said first sidewall, at least first and second arms spaced from one another to form a longitudinal slot having an end aperture facing away from said proximal end, and a distal end comprising said end aperture;

a tape blade retraction spring coupled to said post via said slot so as to provide a retraction bias for a tape measure blade;

a fastener extending through said second sidewall and said end aperture and terminating alone said slot, said fastener engaging said post and anchoring said post distal end to said second sidewall;

a reinforcing collar distinct from said housing and said post, said collar disposed about said post proximate said distal end so as to overlie a portion of said post and said fastener; said collar engaging said post and limiting movement of said arms away from each other;

wherein said fastener has a first pullout resistance level without said collar present and a second higher pullout resistance level with said collar present; said second Pullout level being at least twice said first pullout resistance level;

wherein said second sidewall comprises an inwardly facing recess having a diameter greater than said post distal end; a distal end of said collar disposed in said recess.

15. The tape measure of claim 14 further comprising a tape measure supporting means secured to said housing by said fastener.

16. The tape measure of claim 14:

wherein said post includes an area proximate said distal end having reduced cross-section, wherein said collar engages said post in said reduced area;

further comprising a tape measure supporting means secured to said housing by said fastener; and wherein said collar is metallic.

17. The tape measure of claim 14 wherein said fastener engages an Interior portion of said post to define a fastener engagement region extending from said end aperture to a location where said fastener terminates along said slot wherein said collar overlies and reinforces said post for at least 50% of said fastener engagement region.

18. A power-return tape measure, comprising:

a housing having first and second sidewalls and a peripheral wall extending between said sidewalls;

a post disposed between said first and second sidewalls and extending along a longitudinal axis; said post including a proximal end anchored to said first sidewall, at least first and second arms spaced from one another to form a longitudinal slot having an end aperture facing away from said proximal end, and a distal end comprising said end aperture; said post further comprising an area proximate said distal end having reduced cross-section bounded by a shoulder;

a tape blade retraction spring coupled to said post via said slot so as to provide a retraction bias for a tape measure blade;

a fastener extending through said second sidewall and said end aperture and anchoring said post distal end to said second sidewall; and a reinforcing collar distinct from said housing and said post, said collar disposed about said post proximate said distal end and abutting said shoulder, said collar limiting movement of said arms away from each other.

19. The tape measure of claim 18 wherein said second sidewall comprises an inwardly facing recess having a diameter greater than said post distal end; a distal end of said collar disposed in said recess.

20. The tape measure of claim 18 further comprising a tape measure supporting means secured to said housing by said fastener.

21. A power-return tape measure, comprising:

a main case having first and second sidewalls and a peripheral wall extending between said sidewalls;

a post disposed between said first and second sidewalls and extending along a longitudinal axis; said post including a proximal end anchored to said first sidewall, at least first and second arms spaced from one another to form a longitudinal slot having an end aperture facing away from said proximal end, and a distal end comprising said end aperture;

a tape blade retraction spring coupled to said post via said slot so as to provide a retraction bias for a tape measure blade;

a fastener extending through said second sidewall and said end aperture and anchoring said post distal end to said second sidewall; and means, distinct from said housing and said post, for limiting movement of said arms away from each other;

wherein said second sidewall comprises an inwardly facing recess having a diameter greater than said post distal end; wherein said means is disposed at least partially in said recess.

22. A method of assembling a tape measure, comprising:

providing a main case and a post coupled to said main case, said post having a slot therein extending to a distal end thereof so as to form first and second arms;

coupling a spring to said post via said slot;

supporting a tape measure blade with said housing and providing a retraction force thereto with said spring;

anchoring said distal end of said post to said main case with a fastener, said fastener extending through a sidewall of said main case and engaging said an interior of said post; and disposing a collar about said distal end of said post, internal to said housing, so as to limit movement of said arms away from each other; said collar distinct from said housing and said post, but engaging said post; and wherein a fastener engagement region associated with said post is defined to extend from an opening on said distal end of said post to a location where said fastener terminates along said post, and wherein disposing said collar about said distal end of said post comprises disposing said collar about said distal end of said post so as to overlie at least 50% of said fastener engagement region.

23. The method of claim 22 further comprising fastening a tape measure support means to an exterior of said main case with said fastener.

24. The method of claim 22 wherein said collar at least doubles a pullout resistance of said fastener compared with the same structure without said collar.

* * * * *